United States Patent [19]

Abbey et al.

[11] 4,367,298

[45] Jan. 4, 1983

[54] ONE-PACKAGE COREACTIVE AMINO AND OXIRANE POLYMERS

[75] Inventors: Kirk J. Abbey, Cleveland; James R. Erickson, Brunswick, both of Ohio

[73] Assignee: SCM Corporation, New York, N.Y.

[21] Appl. No.: 254,968

[22] Filed: Apr. 16, 1981

[51] Int. Cl.³ .............................................. C08L 63/10
[52] U.S. Cl. .................................... 523/402; 523/414; 524/501; 524/517
[58] Field of Search ................ 260/29.2 EP, 29.6 RB, 260/29.6 RW, 29.6 NR; 523/414, 402; 524/501, 517; 525/208, 531

[56] References Cited

U.S. PATENT DOCUMENTS 3,945,963  3/1976  Levine et al. ............... 260/29.6 TA
4,128,519  12/1978  Bartoszek et al. .......... 260/29.6 NR

*Primary Examiner*—Theodore E. Pertilla
*Attorney, Agent, or Firm*—Thomas M. Schmitz

[57]     ABSTRACT

An aqueous polymeric composition comprises a stabilized mixture of an amino polymer and an oxirane polymer stabilized in water which maintains the polymers non-reactive. The composition can be cured in use at relatively low temperatures by evaporation of water whereby the amino groups coreact with the oxirane groups to provide a cured composition such as a protective coating or an adhesive.

11 Claims, No Drawings

ONE-PACKAGE COREACTIVE AMINO AND OXIRANE POLYMERS

BACKGROUND OF THE INVENTION

The present invention pertains to ambient and low temperature curable polymer mixtures consisting of a first polymer containing reactive or catalytic amino groups and a second polymer containing oxirane functionality which are one package stable and are useful as coatings and adhesives. Although amino functional polymers are known to react with oxirane containing polymers, in the past, there has been great difficulty in keeping such system fluid and without appreciable co-reaction in a single package.

In the past, separate solvent solutions of epoxy and amino polymers and oligomers have been blended and applied as surface coatings and adhesives. These are two package systems generally having limited pot lives measured in hours. Once the solutions are mixed, individual polymer molecules diffuse and more or less randomly mix allowing the coreactants to come into contact. The cure reactions start independently of whether the mixture is applied to form the surface coating or cover the adherant surface. Within a relatively short period of time, the viscosity of the mixture in the pot increases to the point that film application is no longer possible. A solution to this problem in the case of room temperature curable coatings has been to prereact a secondary amino group with a ketone to form a ketimine prior to mixing in the oxirane containing polymer. After the film is applied, atmospheric moisture causes the ketimine to decompose yielding the reactive amino group and the ketone, allowing the normal cure reaction to occur. There are two main drawbacks to this type of system. First, it is limited to nonaqueous systems and, second, ketone solvent is released upon cure. More recently to reduce solvent pollution, two other approaches have been used. These are to use lower viscosity amino and oxirane containing mixtures that require little or no solvent or to use water as the solvent. Neither approach has yielded stable one package systems that cure at room temperature. In the former case it is obvious that molecular mixing brings the reactants into immediate contact. In the latter case, amino and oxirane functional oligomers and polymers are emulsified separately and blended just before application. Generally, the individual emulsified particles consisting of many individual molecules are not stabilized well enough to prevent co-coagulation with each other. While attempts have been made to reduce the rate of coagulation, there is a second problem which has generally not been appreciated. The emulsified particles may be made relatively stable but individual molecules from them diffuse through the aqueous medium to particles containing the coreactant. This causes the particles to become cross-linked. The result is stabilized rubber particles which will not coalesce or further cross-link to form a servicable coating or adhesive.

We have discovered that if the amino and oxirane functionality is attached to nearly completely water insoluble polymers and the particles are mutually stabilized to prevent coagulation, then the molecular diffusion process can be stopped and a one package system is produced. Upon film application, the water medium evaporates and the particles with coreactive functionality come into intimate contact and cross-link to form a tough, solvent and water resistant coating or adhesive.

The preferred method of dispersing the water insoluble polymer into water is to use latex polymerization methods. This provides very small, relatively uniform, stabilized water insoluble polymer particles. Such latex mixture can be compounded in the usual ways to give surface coatings. These and other advantages will become more apparent from the detailed description and the illustrative examples.

SUMMARY OF THE INVENTION

Briefly, the invention pertains to water dispersed polymer mixtures comprising by weight between 1% and 80% of an amino functional water insoluble polymer and between 99% and 20% of an oxirane functional water insoluble polymer. The amino functional polymer contains by weight at least 0.1 and preferably between 0.3 and 1.1 milliequivalent of reactive nitrogen per gram of polymer, whereas the oxirane polymer contains by weight between 0.2 and 1.6 milliequivalents of oxirane oxygen per gram of polymer.

DETAILS OF THE INVENTION

Referring first to general requirements of the invention, two fundamental criteria must be met. The two resin dispersions, one containing reactive amine functionality and the other containing reactive oxirane functionality, must be suitably stabilized such that coagulation or flocculation does not occur on intermixing the two dispersions. In addition, the reactive moieties must be incorporated into their respective polymer dispersions in such a fashion that the major proportions of the reactive moieties are not capable of diffusing through the aqueous phase. Such flocculation and diffusion of the reactive components would negate the package stability of the intermixture.

Referring first to the amine functional latex, the latex comprises copolymerized ethylenically unsaturated monomers including a certain amount of amino monomer or similar amine component to provide latex polymer particles containing by weight between about 0.3 and 1.1 milliequivalents per gram of copolymerized reactive nitrogen component. Amine monomers can include for example amino derivatives of lower alkyl acrylic or methacrylic monomers such as alkyl acrylamides and methacrylamides. A particularly useful amino monomer is N-tert-butyl-2-amino ethylmethacrylate as well as similar aliphatic amino alkyl methacrylates and acrylates. The amino ethylenically unsaturated monomers can be copolymerized in an aqueous emulsion process with other ethylenically unsaturated monomers such as lower alkyl esters of acrylic or methacrylic acid and can include methyl, ethyl, propyl, butyl acrylates and methacrylates as well as methylhexyl, ethylhexyl and similar acrylates and methacrylates. Further useful ethylenic monomers include vinyl aromatic hydrocarbons such as styrene, alpha-methyl styrene, vinyl toluene and divinyl benzene; as well as aliphatic hydrocarbons such as 1,3 butadiene, methyl-2-butadiene, cyclopentadiene, and similar conjugated dienes.

Amine functional aqueous polymers can be produced by a wide variety of synthesis methods such as free radical copolymerization of free amine monomers with other ethylenic monomers, copolymerization of blocked or incipient amine monomers capable of subsequently converting to active amine, or copolymerization of low molecular weight polyamine, or admixing non-free radically polymerizable polyamines or blocked polyamines with free radically polymerizable monomers, or dispersion of polymeric amines into water by high shear. For instance N-tert-butyl-2-aminoethyl methacrylate and similar tertiary amino ethyl methacrylates can be copolymerized by free radical polymerization with other ethylenically unsaturated monomers. U.S. Pat. No. 4,031,138 suggests copolymerization of N-(amino alkyl) methacrylamides and N-(N-isopropyl-2-aminopropyl)-methacrylamide with other ethylenic monomers. However, any significant addition of primary and secondary amines to ethylenically unsaturated carbonyl compounds, such as acrylates, methacrylates, vinyl ketones, and alkyl maleates, must be avoided. Methacrylates and methacrylamides are useful with free amines having reactivity similar to N-(1-propyl), N-(2-propyl) amine. Other amine monomers such as substituted styrene i.e. 4-vinyl-benzyl amine and 4-vinyl aniline can be prepared. Blocked or incipient amine groups can be produced for instance by utilizing O-tert-alkyl carbamate linkages in an ethylenically unsaturated monomer. Thus, a latex prepared from a monomer adduct of 2-methacryloyl-ethyl isocyanate and tertiary alcohols can be prepared. Similarly a diisocyanate can be reacted with a tertiary alcohol to form a mono-urethane isocyanate adduct, which can be further reacted with a hydroxy or amino functional monomer to produce an incipient amine monomer. A latex prepared therefrom will contain a thermally decomposable urethane linkage which can be heat treated to provide the desired latex containing reactive primary amine functionality. When the amino polymer is to be used as a catalyst source, then tertiary amine monomers such as dimethyl aminoethyl methacrylate may be used.

Referring now to the oxirane functional polymer dispersion, the oxirane dispersion comprises preferably a latex containing about 0.2 and 1.6 meq/gram of oxirane oxygen containing monomers copolymerized with other ethylenically unsaturated monomers polymerized in an aqueous emulsion process. Suitable oxirane monomers are acrylic or methacrylic monomers containing glycidyl or epoxy groups such as glycidyl methacrylate, allyl glycidyl ether, glycidyl acrylate as well as epoxy derivatives produced by reacting monomers such as acrylic, methacrylic or other ethylenically unsaturated acid monomers with a small chain diepoxide such as diglycidyl ether of bisphenol-A. The oxirane monomers can be copolymerized with ethylenically unsaturated monomers having at least one ethylenic double bond capable of addition polymerization. Suitable ethylenic monomers include for example 1,3-butadiene, 2-methyl-1,3-butadiene, 2,3-dimethyl-1,3-butadiene, allylbenzene, diacetone acrylamide, vinylnapthalene, chlorostyrene, 4-vinylbenzyl alcohol, vinyl benzoate, vinyl propionate, vinyl caproate, vinyl chloride, vinyl oleate, dimethyl vinyl sulfonamide, and methyl vinyl sulfonate. Particularly preferred monomers include for example, N-vinyl pyrolidone, vinyl pyridine, styrene, alpha-methyl styrene, tertiary butyl styrene, vinyl toluene, divinyl benzene, vinyl acetate, vinyl versatate, alkyl acrylates and methacrylates such as ethyl acrylate, butyl acrylate, 1,6-hexanediol diacrylate, methyl acrylate, isobornyl acrylate, 2-hydroxyethyl acrylate, 2-phenoxyethyl acrylate, 2-ethylhexyl acrylate, neopentyl glycol diacrylate, 2-ethoxyethyl acrylate, 2-methoxyethyl acrylate, methyl methacrylate, benzyl methacrylate, ethyl methacrylate, and similar alkyl acrylates and methacrylates.

In accordance with this invention, the amine polymer dispersion and oxirane polymer dispersion are separately preformed and are preferably latexes prepared in separate aqueous emulsion polymerization processes. Agents that require amine catalysts such as mercapto curing agents may also be added as part of the latex blend. Emulsion polymerization can be advantageously carried out in an aqueous medium at temperatures between about 5° C. and 100° C. Surfactants can be used and can include for example anionic surfactants such as sodium dodecyl benzene sulfonate and alkyl diesters of sulfosuccinic acid; non-ionic surfactants such as ethylene oxide condensation products reacted with t-octyl phenol or nonylphenol (Triton surfactants), polymerized oxyethylene (Igepals), and ethylene oxide reacted with an organic acid; cationic surfactants such as N-fatty alkyl-N-ethylmorpholinium ethosulphate, N-fatty alkyl-N-diethanol-methyl ammonium halide, and N-(fatty alkyl) pyridinium halide. Surfactants can be preadded to the water or added along with the monomers and ordinarily added on a weight basis of about 0.1 to 2 parts surfactant to 100 parts monomer. The water level of the finished latex ordinarily is around 40% to 60% by weight water. About 0.1% to 2% by weight catalysts are added such as benzoyl peroxide, acetyl peroxide, lauryl peroxide, acetone peroxide, cumene peroxide, persulfates such as ammonium potassium, or sodium persulfates, organic azo compounds such as 2,2'-azobisisobutyronitrile, 4,4' azo-bis-(4-cyano-pentanoic acid), etc. Other agents commonly utilized by those skilled in the art of emulsion polymerization, such as buffers and chain transfer agents, can be employed.

Preferably both the amino latex and the oxirane latex are each produced in two step processes wherein the functional monomer is added in such a way as to produce a core-shell type polymer particle. Hence, the amino latex would contain reactive amine groups disposed on the particle surface, and similarly, the oxirane latex would contain reactive oxirane groups bound on the particle surface, whereby the latexes will remain stable and nonreactive in an aqueous latex mixture. The polymer particle cores can be cross-linked perferably with diethylenically unsaturated comonomers.

In use, the amino latex and oxirane latex are intermixed on weight basis containing 1 to 400 parts of amino latex to 100 parts oxirane latex. The latex system is particularly suitable for use as a binder for paint coatings containing opacifying pigments, inerts, extenders, as well as other latex paint ingredients. Paint coating can be applied as wet films to substrates whereupon the films air dry and coalesce. During colescence, the oxirane and amino groups coreact to produce an excellent thermoset binder. These and other advantages of the invention will become more apparent from the following illustrative examples.

EXAMPLE 1

Amine Latexes

This example requires a three step process. The steps are preparing a latex containing non-diffusing oxirane, amination of said latex, and removal of the residual diffusable amine.

TABLE I

| | Oxirane Latex Recipe | |
|---|---|---|
| Group | Ingredient | pphm |
| A | De-ionized Water | 115.96 |
| | Polywet oligomeric surfactant (acrylnitrile and acrylic acid copolymer) | 0.54 |
| B | $K_2S_2O_8$ | 0.30 |

TABLE I-continued

| Group | Oxirane Latex Recipe Ingredient | pphm |
|---|---|---|
| C | Butyl Acrylate (BA) | 46.36 |
|   | Methyl Methacrylate (MMA) | 41.14 |
|   | Glycidyl Acrylate (GA) | 12.50 |
| D | De-ionized Water | 0.10 |
|   | Sodium formaldehyde sulfoxylate | 0.01 |

Prepared by semi-batch process.

TABLE II

| Amine Functionalization Of The Oxirane Latex of Table I | |
|---|---|
| Ingredient | Amount |
| Latex Table I | 400.0 g |
| TETA[a] | 128.4 g |

[a]TETA = triethylene tetramine

The components of Table II were mixed and then allowed to stand at ambient temperatures in a sealed container for 116 days. The latex was cleaned of surfactant and TETA by ultrafiltration and analyzed for oxirane and amine. The latex contained 0.16 meq/g solids of amine nitrogen and 0.60 meq/g residual oxirane. This corresponds to about 10% consumption of oxirane by the amine (after correcting for normal aging losses of oxirane). The tetra amine was calculated to have reacted on the average of twice per bound amine molecule. That this cross-linking was indeed occurring was confirmed by an increase in gel content from 76% to 88%. The blend in Table II is a counter example of the invention. However, after cleaning, the functionalized latex can be used as the amine latex component when admixed with a highly film-forming oxirane latex.

EXAMPLES 2-4

TABLE III

| | TBAEMA Latex Recipes | | | |
|---|---|---|---|---|
| | | Ex. 2 | Ex. 3 | Ex. 4 |
| Group | Ingredient | | | |
| 1. | De-ionized H$_2$O | 105.80 | 105.80 | 105.80 |
|   | Polywet oligomeric surfactant (acrylnitrile and acrylic acid copolymer) | 0.70 | 0.70 | 0.70 |
|   | NaOH | 0.13 | 0.13 | 0.13 |
|   | NaHCO$_3$ | 0.34 | 0.34 | 0.34 |
| 2. | K$_2$S$_2$O$_8$ | 0.40 | 0.40 | 0.40 |
|   | De-ionized H$_2$O | 12.00 | 12.00 | 12.00 |
| 3. | BA | 54.19 | 52.57 | 49.33 |
|   | MMA | 40.81 | 37.43 | 30.67 |
|   | TBAEMA | 5.00 | 10.00 | 20.00 |
|   | Dodecylmercaptan (DDM) | 0.20 | 0.20 | 0.20 |
| 4. | K$_2$S$_2$O$_8$ | 0.20 | 0.20 | 0.20 |
|   | De-ionized H$_2$O | 6.00 | 6.00 | 6.00 |
| 5. | Sodium formaldehyde sulfoxylate | 0.01 | 0.01 | 0.01 |
|   | De-ionized H$_2$O | 0.01 | 0.01 | 0.10 |
| Gel (%, acetone) | | | | |
| 20 hrs/RT | | 0 | 1 | 1 |
| 20 min/75° C. | | 1 | 0 | 1 |
| 20 min/125° C. | | — | 0 | 4 |
| Theoretical Solids (%) | | 45.2 | 45.2 | 45.2 |
| Particle Size (Wt. Ave., A) | | 4056 | 4334 | 4520 |
| Polydispersity (Wt./No. Ave.) | | 1.45 | 1.31 | 1.21 |
| Cleaned Latex | | | | |
| N.V. % | | — | — | 39.8 |
| Theoretical Amine (meq/g solids) | | — | — | 1.03 |
| Actual Amine (meq/g solids) | | — | — | 1.06 |

The latex of Example 4 was characterized in detail. The latex was cleaned by ultrafiltration and the amine content determined by conductometric titration. The theoretical and actual amine levels are in excellent agreement proving that the amine was totally bound to the latex particle. (This latex was used in Example 8 of a one-pack system, vida supra).

EXAMPLES 5-6 These Are Examples In Which The Amine Is Blocked As The Hydrochloride Salt And The Dodecyl Benzene Sulfonate Salt

TABLE IV

| | Recipe For Latex With 2-Aminoethyl-Methacrylate (AEM) Salts | | |
|---|---|---|---|
| Group | Ingredient | Ex. 5[a] | Ex. 6[a] |
| A | De-ionized Water | 295.68 | 297.4 |
|   | Aerosol C-61 (70%)[b] | 0.20 | — |
| B | AAP.HCl[c] | 1.00 | — |
|   | K$_2$S$_2$O$_8$ | — | 0.40 |
|   | De-ionized Water | — | 2.50 |
| C | BA | 51.14 | 54.89 |
|   | MMA | 45.82 | 39.51 |
|   | Methacrylic Acid (MAA) | 1.00 | — |
|   | AEM—HDBS[d] (79.6% active) | — | 5.62 |
| D | AEM—HCl[e] (35% in water) | 5.83 | — |
|   | Aerosol C-61 (70%) | 1.56 | — |
| E | Formopon | — | 0.01 |
|   | De-ionized Water | — | 0.10 |

[a]parts per hundred parts monomer (Group C + D)
[b]Trademark of American Cyanamid
[c]AAP.HCl = 2,2'-Azobis (2-amidinopropane) hydrochloride, Eastman Kodak QY-641 Initiator
[d]AEM.HDBS = 2-aminoethyl methacrylate hydrogen dodecyl benzene sulfonate
[e]AEM.HCl = 2-aminoethyl methacrylate hydrochloride Procedure:
Both examples were prepared by semi-continuous feed of C and
D added simultaneously to a mixture of A and B at 83° C.

Tables V & VI give the analysis and characterization of these two latexes.

TABLE V

| AEM.HCl LATEX BASE DISTRIBUTION | | | | |
|---|---|---|---|---|
| | Nitrogen Bases | | Carboxylate Bases | |
| Description | Source | meq/g | Source | meq/g |
| Theoretical[a] | AEM | 0.123 | MAA | 0.116 |
|   | AAP Initiator | 0.074 | | |
|   | Aerosol C-61[b] | 0.036 | | |
|   | (Total) | 0.233 | (Total) | 0.116 |
| Found Whole Latex | (Total) | 0.222 | (Total) | 0.113 |
| Supernatant from Whole Latex[d] | | 0.097 | | 0.033 |
| Cleaned Latex[c] | | 0.107 | | 0.081 |
| Supernatant[d] from Cleaned Latex | | 0.000 | | 0.000 |
| (Total) | | 0.204 | (Total) | 0.114 |

[a]The quantity of MAA in the commercial sample of AEM.HCl is not included.
[b]Conductometric titration of this surfactant gave a nitrogen weak base value of 2.92 meq/g. No value was available from the supplier.
[c]By ultrafiltration.
[d]The latex was coagulated by one or more freeze-thaw cycles then filtered through a 40-60 μm sintered-glass funnel.

TABLE VI

| AEM.HDBS LATEX BASE DISTRIBUTION | | | | |
|---|---|---|---|---|
| | Nitrogen Bases | | Carboxylate Bases | |
| Description | Source | meq/g | Source | meq/g |
| Theoretical[a] | AEM | 0.098 | None | 0.000 |
| Whole Latex | | 0.087 | | 0.018 |
| Supernatant from[b] | | 0.018[c]- | | |

TABLE VI-continued

| AEM.HDBS LATEX BASE DISTRIBUTION | | | | |
|---|---|---|---|---|
| | Nitrogen Bases | | Carboxylate Bases | |
| Description | Source | meq/g | Source | meq/g |
| Whole Latex | | 0.045 | | 0.000[c] |

[a] The quantity of MAA in the AEM.HDBS is not included.
[b] The latex was coagulated by one or more freeze-thaw cycles then filtered through a 40–60 μm sintered-glass funnel.
[c] Broad endpoints; a separate carboxylate could not be discerned; duplicate experiments.

The AEM.HDBS latex, Ex. 6, has between 54–71% of the amine bound to the latex. The remainder is apparently water soluble polymer. For Ex. 5 a minimum content of 33% bound amine can be calculated. The error in obtaining a maximum amount of 92% bound occur due to the initiator fragments and surfactant which titrate as amine. Both examples 5 and 6 would require cleaning for this invention.

EXAMPLE 7

An oxirane latex was produced from the following ingredients based on 100 weight parts of monomer.

TABLE VII

| Ingredients[a] | |
|---|---|
| 1. De-ionized H$_2$O | 112.39 |
| Polywet KX-4 | 0.54 |
| 2. K$_2$S$_2$O$_8$ | 0.30 |
| De-ionized H$_2$O | 10.00 |
| 3. Butyl acrylate | 52.17 |
| Methyl methacrylate | 33.59 |
| Glycidyl methacrylate | 14.24 |
| 4. A.W.C. Rice (Diamond Shamrock) | 0.01 |
| De-ionized H$_2$O | 0.10 |
| 5. Super-Ad-It | 0.10 |

EXAMPLE 8

The 20% TBAEMA latex of Example 4 was blended with the glycidyl latex of Example 7 on the basis of one amine nitrogen per oxirane moiety on a weight basis of 77 parts TBAEMA latex to 100 parts glycidyl latex to provide a latex system. The latex mixture was then cast as a film to provide an excellent paint film. Tables IX and X contain stability and cure data.

COUNTER EXAMPLES 9-11

These examples help prove the stated requirements for package stability and reactivity.

EXAMPLE 9

A blend of an anionically and nonionically stabilized emulsion of Epon 828 (2.13 g) with the amine latex of Example 4 (10.0 g) was prepared such that a theoretical ratio of nitrogen to oxirane was 1:1. (See Tables IX and X for properties).

EXAMPLE 10

A blend of the General Mills epoxy emulsion Genepoxy 370-H55 (2.04 g) with the amine latex of Example 4 (10.0g) was prepared as in Example 9. (Also in Tables IX and X).

EXAMPLE 11

A latex was prepared as in Table VIII that contained an amine monomer, TBAEMA, as well as an oxirane monomer, GA. The properties are included also in Tables IX and X.

TABLE VIII

| GA/TBAEMA LATEX | | |
|---|---|---|
| Group | Ingredient | Parts |
| A | De-ionized water | 103.74 |
| | Polywet KX-4 | 0.70 |
| | NaOH | 0.13 |
| | NaHCO$_3$ | 0.37 |
| B | K$_2$S$_2$O$_8$ | 0.40 |
| | De-ionized water | 12.00 |
| C | K$_2$S$_2$O$_8$ | 0.20 |
| | De-ionized water | 6.00 |
| D | BA | 44.74 |
| | MMA | 37.76 |
| | GA | 12.50 |
| | TBAEMA | 5.00 |
| | CHCl$_3$ | 0.50 |
| E | A.W.C. Rice | 0.01 |
| | De-ionized water | 0.10 |
| F | Super-Ad-It | 0.10 |

Polymerized by a semi-batch process at 83° C. in which B was added initially and C added half-way through the monomer feed. E is a chaser catalyst and F is a post-added fungicide.

TABLE IX

| GEL CONTENT OF EXAMPLES 8-11: ROOM TEMPERATURE VS. TIME | | | | | | | | |
|---|---|---|---|---|---|---|---|---|
| Time | Example 8 | | Example 9 | | Example 10 | | Example 11 | |
| (Days) | Package | Film | Package | Film | Package | Film | Package | Film |
| 0 | 36 | 36 | 0 | 0 | 0 | 0 | 74 | 74 |
| 7 | 36 | 45 | 38 | 24 | 35 | 23 | — | — |
| 14 | 35 | 46 | 51 | 43 | 53 | 45 | — | — |
| 30 | — | — | — | — | — | — | 85 | 92[a] |

[a] Aged 30 days in package then 7 days as a film.

TABLE X

| GEL CONTENT OF EXAMPLES 8-11 VS. TEMPERATURE | | | | |
|---|---|---|---|---|
| | Example 8 | Example 9 | Example 10 | Example 11 |
| 2 hrs. at rm. temp. | 36 | 0 | 0 | 74 |
| 20 min. at 75° C. | 40 | 1 | 0 | 90 |
| 20 min. at 125° C. | 53 | 32 | 32 | 94 |

In addition to these comparative examples, Example 1 and similar additions of low molecular weight polyamines show that reaction occurs in the package. Other amines and agents that have shown this behavior are 1,6-hexanediamine, PACM-20, Epicure 874, Tonox, and others.

The foregoing examples are not intended to be limiting except by the appended claims.

We claim:

1. A low temperature cure, one-package stabilized aqueous dispersed coreactive polymer composition comprising on a weight basis:
   between 1% and 80% of an amino functional water insoluble polymer having reactive amine groups containing 0.1 to 1.1 meq. of reactive nitrogen per gram of polymer and between 20% and 99% oxirane functional water insoluble polymer having reactive oxirane groups containing 0.2 to 1.6 meq. of reactive oxirane oxygen per gram of polymer, wherein said amino polymer and said oxirane polymer are stable when dispersed in water and are adapted to coreact upon removal of water.

2. The composition in claim 1 wherein said composition is a surface coating composition and said amino groups coreact with said oxirane groups upon evaporation of the water from the surface coating film.

3. The compositions in claim 1 wherein the composition is an adhesive composition.

4. The composition in claim 1 wherein the stabilized amino polymer is essentially not capable of diffusing through the aqueous phase.

5. The composition in claim 1 wherein the stabilized oxirane polymer is essentially not capable of diffusing through the aqueous phase.

6. The composition in claim 1 wherein the stabilized amino polymer and the oxirane polymer are essentially insoluble in water wherein oxirane and amino groups are essentially incapable of diffusing through the aqueous phase.

7. A low temperature cure aqueous dispersed polymer composition on a weight basis:
between 1 and 80% of an amino functional polymer having reactive amino groups containing 0.1 to 1.1 meq/gram of reactive or catalytic amino groups, and between 20% and 99% oxirane functional polymer having reactive oxirane groups containing 0.2 to 1.6 meq/gram of reactive oxirane groups, wherein said amino polymer and said oxirane polymer are stable when dispersed in water and curing the oxirane groups.

8. The composition in claim 7 wherein said composition is a surface coating and contains an amine curing agent for coreacting with said oxirane groups upon evaporation of the water from the surface coating.

9. The composition of claim 7 wherein the composition is an adhesive composition.

10. The composition of claim 8 wherein the curing agent is a polymercaptan.

11. The composition of claim 8 wherein the curing agent comprises an additional 1 to 40% of the total of the amino functional polymer and the oxirane functional polymer.

* * * * *